(12) United States Patent
Zhang et al.

(10) Patent No.: US 11,647,418 B2
(45) Date of Patent: May 9, 2023

(54) RESOURCE REQUEST METHOD AND DEVICE, METHOD AND DEVICE FOR PROCESSING RESOURCE REQUEST

(71) Applicant: ZTE CORPORATION, Guangdong (CN)

(72) Inventors: Boyuan Zhang, Guangdong (CN); Lin Chen, Guangdong (CN); Ying Huang, Guangdong (CN); Mengzhen Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/764,645

(22) PCT Filed: Nov. 6, 2018

(86) PCT No.: PCT/CN2018/114225
§ 371 (c)(1),
(2) Date: May 15, 2020

(87) PCT Pub. No.: WO2019/096034
PCT Pub. Date: May 23, 2019

(65) Prior Publication Data
US 2020/0288344 A1 Sep. 10, 2020

(30) Foreign Application Priority Data
Nov. 16, 2017 (CN) .......................... 201711141257.9

(51) Int. Cl.
*H04W 76/11* (2018.01)
*H04W 28/02* (2009.01)
(Continued)

(52) U.S. Cl.
CPC ......... *H04W 28/0278* (2013.01); *H04W 4/40* (2018.02); *H04W 28/06* (2013.01); *H04W 76/11* (2018.02); *H04W 92/18* (2013.01)

(58) Field of Classification Search
CPC ..... H04W 4/40; H04W 4/80; H04W 28/0278; H04W 28/06; H04W 28/18; H04W 72/0453; H04W 72/1263; H04W 72/23
(Continued)

(56) References Cited

U.S. PATENT DOCUMENTS

2017/0118671 A1* 4/2017 Lee .................. H04W 28/0278
2017/0127251 A1  5/2017 Yi et al.
(Continued)

OTHER PUBLICATIONS

3GPP. "Evolved Universal Terrestrial Radio Access (E-UTRA) and Evolved Universal Terrestrial Radio Access Network (E-UTRAN); Overall description; Stage 2" 3GPP TS 36.300 V14.4.0. Sep. 30, 2017 (Sep. 30, 2017).
(Continued)

*Primary Examiner* — Harun Chowdhury
(74) *Attorney, Agent, or Firm* — KDW Firm PLLC

(57) ABSTRACT

Provided are a resource requesting method and device, and a resource request processing method and device. The method includes: acquiring, by a terminal, a buffer size corresponding to an same frequency point or anchor frequency point in a logical channel group; reporting, by the terminal, an Sidelink BSR to a base station, where the Sidelink BSR includes at least one of: a destination index corresponding to the same frequency point or anchor frequency point; a logical channel group identifier or a logical channel identifier; or a buffer size.

17 Claims, 6 Drawing Sheets

(51) Int. Cl.
  *H04W 4/40* (2018.01)
  *H04W 28/06* (2009.01)
  *H04W 92/18* (2009.01)
(58) Field of Classification Search
  USPC .................................. 370/228, 230, 328, 329
  See application file for complete search history.

(56) References Cited

U.S. PATENT DOCUMENTS

| 2017/0245292 A1* | 8/2017 | Agiwal | H04W 72/23 |
| 2018/0279162 A1* | 9/2018 | Yi | H04W 28/0278 |
| 2019/0098651 A1* | 3/2019 | Wu | H04W 72/1263 |
| 2019/0174522 A1* | 6/2019 | Xiao | H04W 28/18 |
| 2020/0229194 A1* | 7/2020 | Belleschi | H04W 72/0453 |

OTHER PUBLICATIONS

Asustek. "Discussion on Relay UE Serving Multiple Sidelinks for One Remote UE" 3GPP TSG-RAN WG2 Meeting #93 R2-161182, Feb. 19, 2016.
International Search Report for the International Patent Application No. PCT/CN2018/114224, dated Jan. 30, 2019, 2 pages.

\* cited by examiner

RESOURCE REQUEST METHOD AND DEVICE, METHOD AND DEVICE FOR PROCESSING RESOURCE REQUEST

CROSS-REFERENCE TO RELATED APPLICATIONS

This application is a National Stage Application, filed under 35 U.S.C. 371, of International Patent Application No. PCT/CN2018/114225 filed on Nov. 6, 2018, which claims priority to a Chinese patent application No. 201711141257.9 filed with CNIPA on Nov. 16, 2017, contents of both which are incorporated herein by reference in their entireties.

TECHNICAL FIELD

The present disclosure relates to the field of communications and, specifically, relates to a resource requesting method and device, a resource request processing method and device.

BACKGROUND

In the related art, with the development of communication technology and increasing of demand, application scenarios of wireless communication are becoming more and more extensive, in which Vehicle-to-Everything (Vehicle Networking) is a typical scenario. The V2X means that vehicle may take part into the wireless communication, and employ advanced wireless communication technologies to implement real-time information interactions between vehicles, between vehicles and roadside infrastructure, informing each other of the current status (including the position, speed, acceleration and traveling path of the vehicle) and the learned road environment information, cooperatively acquiring road hazard conditions, and providing various collision warning information in time to prevent road traffic accidents.

There are three specific modes of Vehicle-to-Everything communications: Vehicle-to-Vehicle Communications (V2V), Vehicle-to-Infrastructure Communications (V2I), and Vehicle-to-Pedestrian (V2P), which may also be collectively referred to Vehicle-to-Everything (V2X) communications.

In the V2X communication mode, transmission of V2X information is implemented through broadcasting or multicasting in most cases. There are two main implementation techniques for the V2X communication.

The first implementation technique is broadcast transmission of V2X messages via a PC5 interface supported by user equipment (UE) to UE direct discovery/communication (D2D, sidelink, ProSe); the second implementation technique is transmission of the V2X messages via a Uu interface supported by a multicast broadcast single frequency network (MBMS) broadcast mechanism. This application focuses on implementation of communication mechanism of V2V message transmission and long-term evolution (LTE) standards based on the PC5 interface.

The traditional base station-centered cellular network has significant limitations in supporting high data rates and proximity services. Under this background, a device-to-device (D2D) technology, which represents a new development direction for future communication technologies, has emerged. The application of the D2D technology may reduce the burden of the cellular network, reduce the battery power consumption of a user equipment (UE), increase a data rate, and improve the robustness of network infrastructure, which satisfies the requirements for high data rate traffic and proximity services. At present, the D2D technology is also called proximity services (ProSe), unilateral link or Sidelink (SL).

In the V2X communication, two resource allocation modes are supported: 1) scheduled resource allocation (also known as mode 3), in which the UE needs to enter a radio resource control (RRC) connection state and the base station allocates dedicated Internet of Vehicles transmission resources; 2) UE autonomous resource selection (also known as mode 4), in which the UE autonomously selects resources from a resource pool for sidelink control information (SCI) and data transmission based on sensing. This mode may be used in the UE in an idle state or a connected state.

In the existing mechanism, in the V2X communication, the UE may use resources on multiple carriers to send and receive data on a sidelink. The V2X service type corresponding to each V2X data is usually associated with one or more available frequency points. A higher layer may send a destination ID corresponding to different V2X service types to an AS layer. When the connected UE requests the V2X SL resource configuration, it can report the destination ID of the service corresponding to each frequency point to the base station through SidelinkUEInformation. FIG. 1 is a schematic diagram of a serialization mode in the related art, as the serialization mode shown in FIG. 1, the base station and the UE generate the same Destination Index, used for uniquely indicating the correspondence between the frequency point and the destination ID. If the UE is configured by the base station to use resource allocation mode3, the UE may request resources of the corresponding frequency point for the base station through a Buffer Status Report (BSR), which carries information of a destination index, a logical channel group (LCG), and a buffer size, etc. The base station allocates SL transmission resources on the corresponding frequency point to the UE according to BSR request of the UE.

In addition to the above dynamic resource scheduling, to facilitate the base station allocating semi-static scheduling (SPS) resources to the UE, R14 V2X sends SPS auxiliary messages, which includes indication information of periodicity, an offset amount, a data size and the PPPP, to the base station through the UE, so as to assist the base station in allocating SPS SL resources to the UE.

However, after introducing scenarios of data split and data duplication in carrier aggregation, for the same logical channel group, different PPPP packets will be transmitted. In this case, the existing mechanism cannot effectively indicate the size of the resource requested for each frequency point.

In the related art, with the evolution of the fifth generation communication technology, there is a higher demand for the latency of V2V/V2I/V2P services, which is from the previous 100 ms to 10 ms or even 3 ms. At the same time, under the premise of ensuring low latency requirements, for some special services, high reliability of data transmission also needs to be guaranteed.

Before this, for a scenario where the V2X service is transmitted on a single carrier, the feature of automatic repeat request (ARQ) is not supported. Moreover, the hybrid automatic retransmission only supports the media access control (MAC) protocol data unit (PDU) retransmission with a specifically configured number of times, and there is no feedback of ACK/NACK messages. Therefore, the data retransmission service of V2X on a single carrier currently uses a time domain multiplexing mode.

On the other hand, to improve the data transmission rate, it is recommended to adopt a frequency domain multiplexing mode to increase the data transmission amount per unit time on multiple carriers. However, it is still unknown how the UE requests resources on multiple carriers and how the base station reasonably allocates resources for each carrier used by the terminal and provides higher resource efficiency.

SUMMARY

Embodiments of the present disclosure provide a resource requesting method and device, and a resource request processing method and device, so as to at least enhance efficiency in requesting resources by a terminal.

According to an embodiment of the present disclosure, a resource requesting method is provided. The method includes: acquiring, by a first communication mode, a buffer size corresponding to an same frequency point or anchor frequency point in a logical channel group; transmitting, by the first communication node, an Sidelink Buffer Status Report (BSR) to a second communication node, where the Sidelink BSR comprises at least one of: a destination index corresponding to the same frequency point or anchor frequency point; a logical channel group identifier or a logical channel identifier; or the buffer size.

According to an embodiment of the present disclosure, a resource requesting method is provided. The method includes: acquiring, by a first communication node, a buffer size corresponding to one or more frequency points in a logical channel, wherein the logical channel uses the one or more frequency points; and reporting an Sidelink BSR according to a destination index corresponding to the one or more frequency points respectively, where the BSR comprises a buffer size of the frequency points used in the logical channel.

According to another embodiment of the present disclosure, a resource request processing method is provided. The method includes: receiving, by a second communication node, an Sidelink BSR reported by a first communication node, where the Sidelink BSR includes at least one of: one or more logical channels in a logical channel group, a destination index corresponding to an same frequency point to be used or an same anchor frequency point to be used; a logical channel group identifier or a logical channel identifier; or a buffer size of the same frequency point or anchor frequency point; and allocating resources on a plurality of frequency points for the first communication node according to the Sidelink BSR.

According to another embodiment of the present disclosure, a resource requesting device is provided. The device includes: a first acquisition module, which is configured to acquire a buffer size corresponding to an same frequency point or anchor frequency point in a logical channel group; a first transmission module, which is configured to transmit an Sidelink BSR to a second communication node, where the Sidelink BSR includes at least one of: a destination index corresponding to the same frequency point or anchor frequency point; a logical channel group identifier or a logical channel identifier; or the buffer size.

According to another embodiment of the present disclosure, a resource requesting device is further provided. The device includes: a second acquisition module, which is configured to acquire a buffer size corresponding to one or more frequency points in a logical channel, where the logical channel uses the one or more frequency points; a second transmission module, which is configured to report an Sidelink BSR according to a destination index corresponding to the one or more frequency points respectively, where the Sidelink BSR includes a buffer size of the frequency points used in the logical channel.

According to another embodiment of the present disclosure, a resource request processing device is further provided. The device includes: a first reception module, which is configured to receive an Sidelink BSR reported by a first communication node, where the Sidelink BSR includes at least one of: one or more logical channels in a logical channel group, a destination index corresponding to an same frequency point to be used or an anchor frequency point to be used; a logical channel group identifier or a logical channel identifier; or a buffer size of the same frequency point or anchor frequency point; and an allocation module, which is configured to allocate resources on frequency points for the first communication node according to the Sidelink BSR.

According to another embodiment of the present disclosure, a storage medium is further provided. The storage medium includes stored programs which, when executed, execute the method of any one of the embodiments described above.

According to another embodiment of the present disclosure, a processor is further provided. The processor is used for executing programs which, when executed, execute the method of any one of the embodiments described above.

Through the present disclosure, a terminal acquires a buffer size corresponding to an same frequency point or anchor frequency point in a logical channel group; the terminal transmits an Sidelink BSR to a base station, where the Sidelink BSR includes at least one of: a destination index corresponding to the same frequency point or anchor frequency point; a logical channel group identifier or a logical channel identifier; or a buffer size. The terminal transmits the Sidelink BSR carrying the above parameters to the base station to request resources, and the base station allocates the resources for the terminal on the frequency point according to the above parameters. In this way, the efficiency in requesting the resources by the terminal is enhanced. The base station can reasonably allocate the resources on carriers for the terminal.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure, and do not form improper limits to the present disclosure. In the drawings.

DETAILED DESCRIPTION

This application be applied to scenarios using a PC5 interface, which includes but is not limited to Internet of Vehicles communications. In the present application, a first communication node may be a terminal, and a second communication node may be a base station.

Embodiment One

Figure 1:
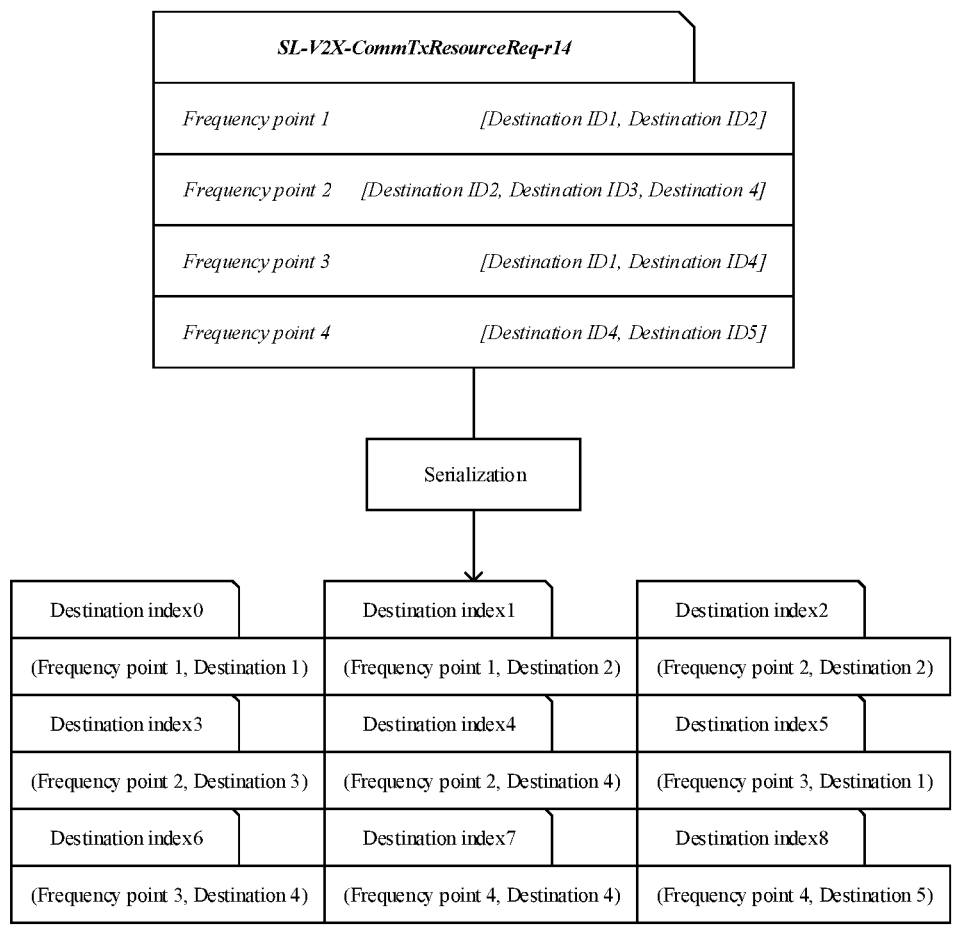
FIG. 1 is a schematic diagram of a serialization mode in the related art.
Figure 2:
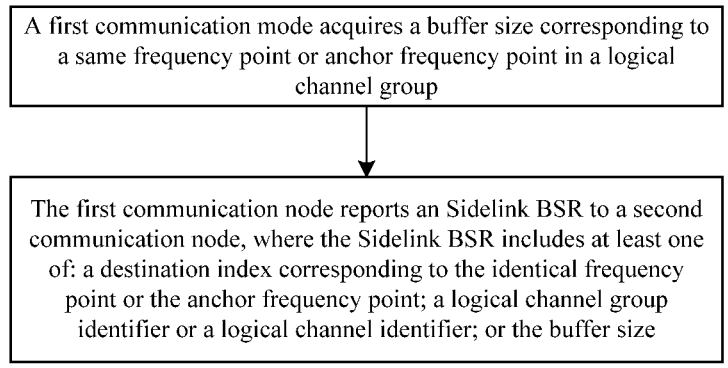
FIG. 2 is a flowchart of a resource requesting method according to an embodiment of the present disclosure.

This embodiment provides a resource requesting method executed on a terminal described above. FIG. 2 is a flowchart of a resource requesting method according to an embodiment of the present disclosure. As shown in FIG. 2, the method includes the steps described below.

In step S202, a first communication mode acquires a buffer size corresponding to an same frequency point or anchor frequency point in a logical channel group.

In step S204, the first communication node transmits a Sidelink BSR to a second communication node, where the Sidelink BSR includes at least one of: a destination index corresponding to the same frequency point or anchor frequency point; a logical channel group identifier or a logical channel identifier; or the buffer size.

Through the above steps, the terminal transmits the Sidelink BSR carrying the above parameters to the base station to request resources, and the base station allocates the resources for the terminal on the frequency point according to the above parameters. In this way, the efficiency in requesting the resources by the terminal is enhanced. The base station can reasonably allocate the resources on carriers for the terminal.

It may be understood that the destination index has a function of uniquely indicating a correspondence between the frequency point/anchor frequency point and the destination ID, such as expressed as: destination index==>{frequency point, destination ID}.

The anchor frequency point may indicate a set of available carriers, so the destination index of the anchor frequency point may indicate the following information: destination index==>{anchor frequency point, destination ID}. The anchor frequency point may be a set of frequency points, which is expressed as anchor frequency points==>[a set of frequency points].

In one or more embodiments, the above steps may, but may not necessarily, be executed by the terminal, such as a vehicle.

In one or more embodiments, before the first communication node reports the Sidelink BSR, the first communication node reports frequency point information configured or agreed in advance by the second communication node includes at least one of: Sidelink available frequency point information; a number of frequency points supporting data distribution or data duplication; a split ratio of each data split frequency point; one or more split data sizes corresponding to the logical channel, wherein the split data size is a maximum data transmission amount of data of the logical channel split to a certain frequency point; mapping information of an Sidelink logical channel and/or an Sidelink logical channel group and/or a destination identifier with one or more frequency points; a frequency point priority; or information corresponding to the anchor frequency point of the logical channel and/or the destination identifier.

In one or more embodiments, before the first communication node reports the Sidelink BSR to the second communication node, the method further includes at least one of: the first communication node determines the number of frequency points to be used and/or a data transmission amount at each frequency point to be used according to at least one of: available frequency point information; the split data size; the split ratio; the number of frequency points supporting the data distribution or the data duplication; and the frequency point priority; or the first communication node determines at least one of the following information corresponding to the data duplication of a bearer: a number of frequency points to be used, a mapping relationship between the frequency point and the logical channel corresponding to the bearer.

In one or more embodiments, before the frequency point information configured or pre-configured by the second communication node is received, the method further includes: the first communication node reports at least one of parameters corresponding to each destination identifier or logic channel to the second communication node: a data rate; a reliability level; and ProSe Per-Packet Priority (PPPP) information.

In one or more embodiments, before the first communication node reports the Sidelink BSR to the second communication node, the method further includes: in a case where the first communication node confirms that the logical channel corresponding to any frequency point has data to be sent, and the logical channel corresponding to the any frequency point had no data to be sent before, the first communication node is triggered to report the Sidelink BSR.

In one or more embodiments, the step in which the first communication node determines the number of frequency points to be used and/or a data transmission amount on each frequency point according to at least one of: available frequency point information; the split data size; the split ratio; the number of frequency points supporting the data distribution or the data duplication; or the frequency point priority includes at least one of: in a case where the buffer size of the logical channel is less than the split data size, the first communication node selects a first frequency point to transmit data; in a case where the buffer size of the logical channel is greater than the split data size, using, by the first communication node, the first frequency point to transmit data of the split data size, selecting other frequency points in available frequency points to transmit data of remaining data size, where data amount transmitted at each frequency point in the other frequency points does not exceed the split data size; and the first communication node determines data amount transmitted at each frequency point according to the buffer size and the split ratio of the logical channel.

In one or more embodiments, the first communication node selects the first frequency and/or the other frequency points in a following manner: the first communication node selects the frequency points used for data distribution in a high-to-low order according to priorities of the frequency points.

In one or more embodiments, before by the first communication node reports the Sidelink BSR to the second communication node, the method further includes: the first communication node reports only a destination identifier corresponding to the anchor frequency point in SidelinkUE-Information.

In one or more embodiments, before the first communication node reports the Sidelink BSR to the second communication node, the first communication sends at least one of the following information to the second communication node: a destination identifier, available frequency point information corresponding to the logical channel group and/or the logical channel, wherein the available frequency point information comprises the anchor frequency point supporting the destination identifier, and/or optional frequency point information; or the destination identifier, data split indication information corresponding to the logical channel group and/or the logical channel.

In one or more embodiments, in a case where the logical channel group includes multiple logical channels, a sum of the buffer size of the corresponding same frequency point or anchor frequency point in the logical channels.

In one or more embodiments, the first communication node reports the Sidelink BSR to the second communication node includes: the first communication node reports the BSR according to the destination index corresponding to the anchor frequency point.

According to another embodiment of the present disclosure, a resource requesting method is further provided. The method includes: a first communication node acquires a buffer size corresponding to one or more frequency points in a logical channel, where the logical channel uses the one or more frequency points; and reporting an Sidelink BSR according to a destination index corresponding to the one or more frequency points respectively, where the BSR includes a buffer size of the frequency points used in the logical channel.

In one or more embodiments, the step in which the Sidelink BSR is reported according to the destination index corresponding to the one or more frequency points respectively includes: when the first communication node reports a v2x-Destination Info List corresponding to each frequency point in the SidelinkUEInformation, a correspondence between a destination ID and each logical channel is reported simultaneously.

In one or more embodiments, in the case where the destination ID has an anchor frequency point corresponding to different logical channels, the step in which the first communication node reports the v2x-Destination Info List corresponding to each frequency point in the Sidelink UE information includes: the first communication node reports in the SidelinkUEInformation, only the destination ID in the v2x-Destination Info List corresponding to the anchor frequency point in each logical channel.

According to another embodiment of the present disclosure, a resource request processing method is provided. The method includes: a second communication node receives an Sidelink BSR reported by a first communication node, where the Sidelink BSR includes at least one of: a logical channel group identifier or a logical channel identifier; one or more logical channels in a logical channel group, a destination index corresponding to an same frequency point to be used or an anchor frequency point to be used; or a buffer size of the same frequency point or anchor frequency point; and resources are allocated on frequency points for the first communication node according to the Sidelink BSR.

In one or more embodiments, before the second communication node receives the Sidelink BSR reported by the first communication node, frequency point information configured or agreed in advance by the second communication node for the first communication node includes at least one of: Sidelink available frequency point information; a number of frequency points supporting data distribution or data duplication; a split ratio of each data split frequency point; one or more split data sizes corresponding to the logical channel, where the split data size is a maximum data transmission amount of data of the logical channel split to a certain frequency point; mapping information of an Sidelink logical channel and/or an Sidelink logical channel group and/or a destination identifier with one or more frequency points; a frequency point priority; or information corresponding to the anchor frequency point of the logical channel and/or the destination identifier.

In one or more embodiments, before the second communication node configures or agrees in advance to the frequency point information for the first communication node, the second communication node receives at least one of parameters corresponding to each Vehicle-to-Everything (V2X) destination identifier or logical channel reported by the first communication node: a data rate; a reliability level; or ProSe Per-Packet Priority (PPPP) information.

In one or more embodiments, the step in which the second communication node receives the Sidelink BSR reported by the first communication node, the second communication node receives at least one of the following information sent by the first communication node: a destination identifier, available frequency point information corresponding to the logical channel group and/or the logical channel, where the available frequency point information comprises the anchor frequency point supporting the destination identifier, and/or optional frequency point information; or the destination identifier, data split indication information corresponding to the logical channel group and/or the logical channel.

In one or more embodiments, before the second communication node receives the Sidelink BSR reported by the first communication node, the method further includes: SidelinkUEInformation of the first communication node is received, where the SidelinkUEInformation includes only the destination identifier corresponding to the anchor frequency point, where destination identifier information is used for identifying the destination identifier.

In one or more embodiments, the step in which resources are allocated on frequency points for the first communication node according to the Sidelink BSR includes: the second communication node receives a BSR reported by the first communication node according to the destination index corresponding to the anchor frequency point; the second communication node executes at least one of: acquiring the destination identifier according to the destination index in the BSR, and acquiring available frequency point information corresponding to the destination identifier; the second communication node determines whether to use a frequency point in the available frequency point information according to the data split indication information; and in a case of determining to use the frequency point in the available frequency point information, the second communication node determines a frequency point of resources to be allocated, allocates the resources in the frequency point of the resources to be allocated.

In one or more embodiments, the step in which resources are allocated on frequency points for the first communication node according to the Sidelink BSR includes: the second communication node receives the BSR reported by the first communication node according to multiple destination indexes corresponding to multiple frequency points;

and the second communication node allocates the resources on the multiple frequency points.

The present disclosure will be described below in detail in conjunction with specific embodiments.

The main consideration of the present disclosure is the allocation of V2X communication resources. Through the present disclosure, the UE can quickly and efficiently apply for the required resources. Through the resource request indication reported by the UE, the base station quickly and flexibly allocates resources to the UE, and ensures the smooth progress of the V2X data transmission.

For resource requests of the current UE, the resource requests may be divided into the following scenarios.

In a first scenario, data of a Vehicle-to-Everything (V2X) service type is transmitted on resources of only one frequency point. In this scenario, the base station may use a frequency point and destination ID information included in SidelinkUEInformation reported by the UE and BSR information of a destination index reported by the UE to derive a correspondence between the destination index and the frequency point so as to allocate resources of the buffer size corresponding to a specific frequency point to the UE.

In a second scenario, data of a Vehicle-to-Everything (V2X) service type may be transmitted on resources of multiple frequency points. According to a correspondence between a logical channel group, a logical channel (LCH) and the frequency point, this scenario may be further divided into following scenarios.

Figure 3:
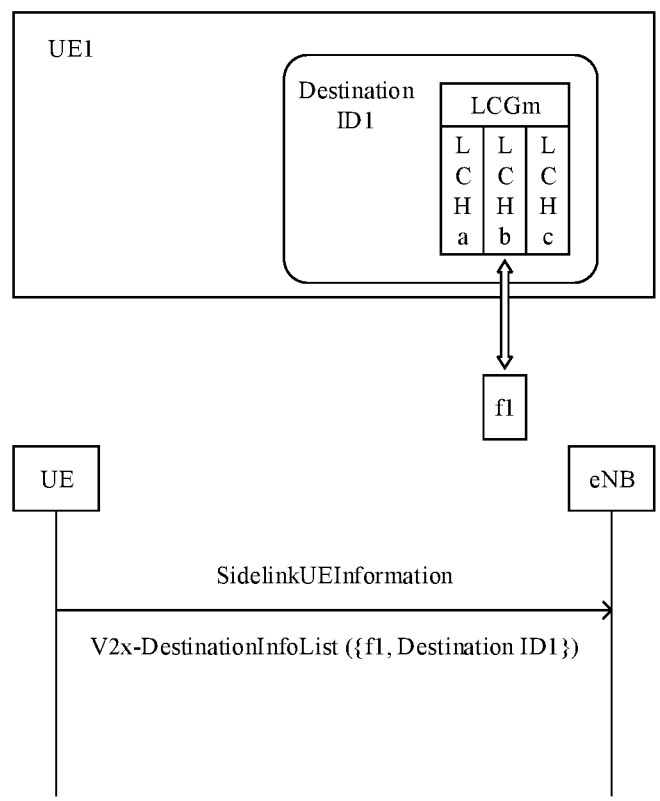
FIG. 3 is a schematic diagram illustrating that all logical channels in a logical channel group use only one same frequency point resource according to an embodiment of the present disclosure.

1) All logical channels in a logical channel group use resources on the only one frequency point. And different logical channel groups use different frequency points. FIG. 3 is a schematic diagram illustrating that all logical channels in a logical channel group use only one same frequency point resource according to the embodiment of the present disclosure. As shown in FIG. 3, in this scenario, the UE reports the same destination ID included in the V2x-DestinationInfoList corresponding to different frequency points at the time of SidelinkUEInformation. At the same time, each logical channel created by a transmitting end UE corresponds to a specific combination of a source ID, PPPP, and the destination ID. In a case of the same destination ID, the UE may request resources on different frequency points for different PPPP data packets. That is, in the BSR sent by the UE, different frequency point resources are requested by indicating different logical channel groups. That is, the existing BSR mechanism is able to meet this reporting requirement.

Figure 4:
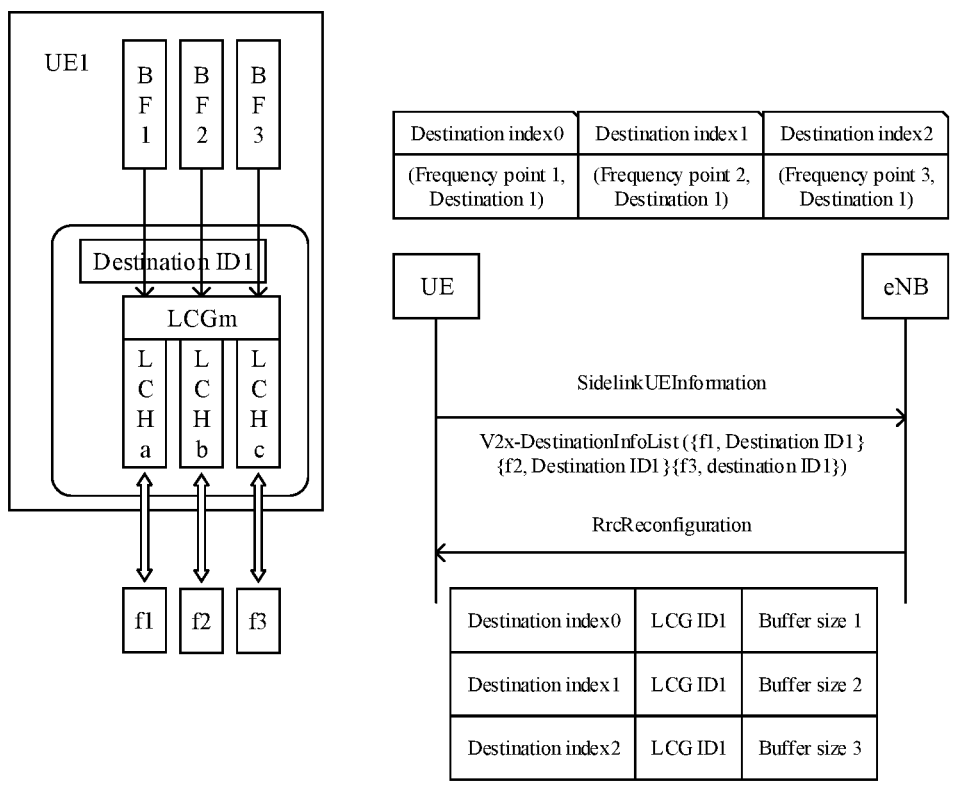
FIG. 4 is a schematic diagram illustrating that each logical channel in a logical channel group uses only one and different frequency point resource according to an embodiment of the present disclosure.
Figure 5:
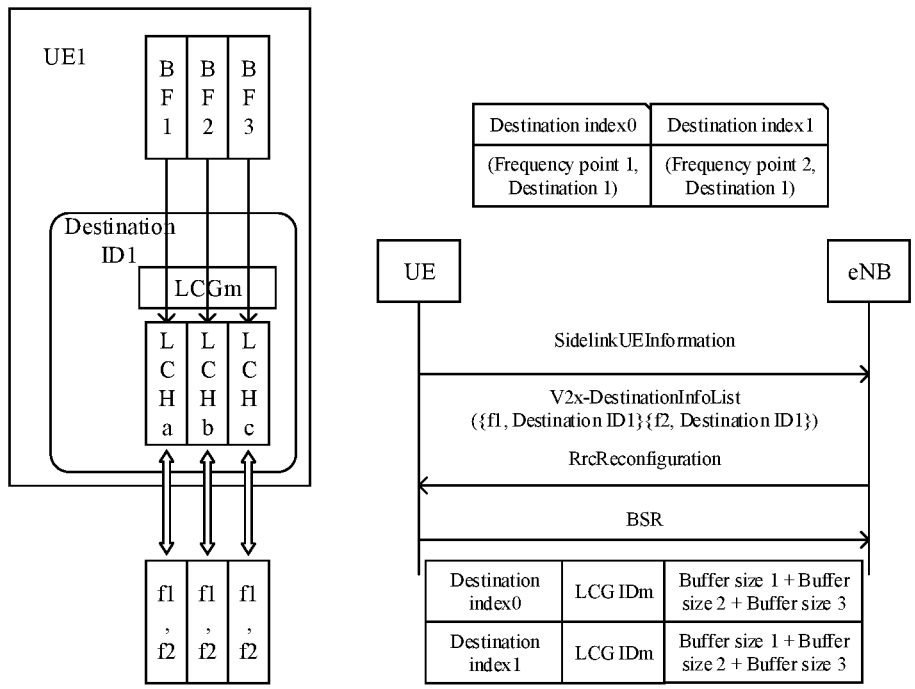
FIG. 5 is a schematic diagram illustrating that different logical channels use an same frequency point set according to an embodiment of the present disclosure.
Figure 6:
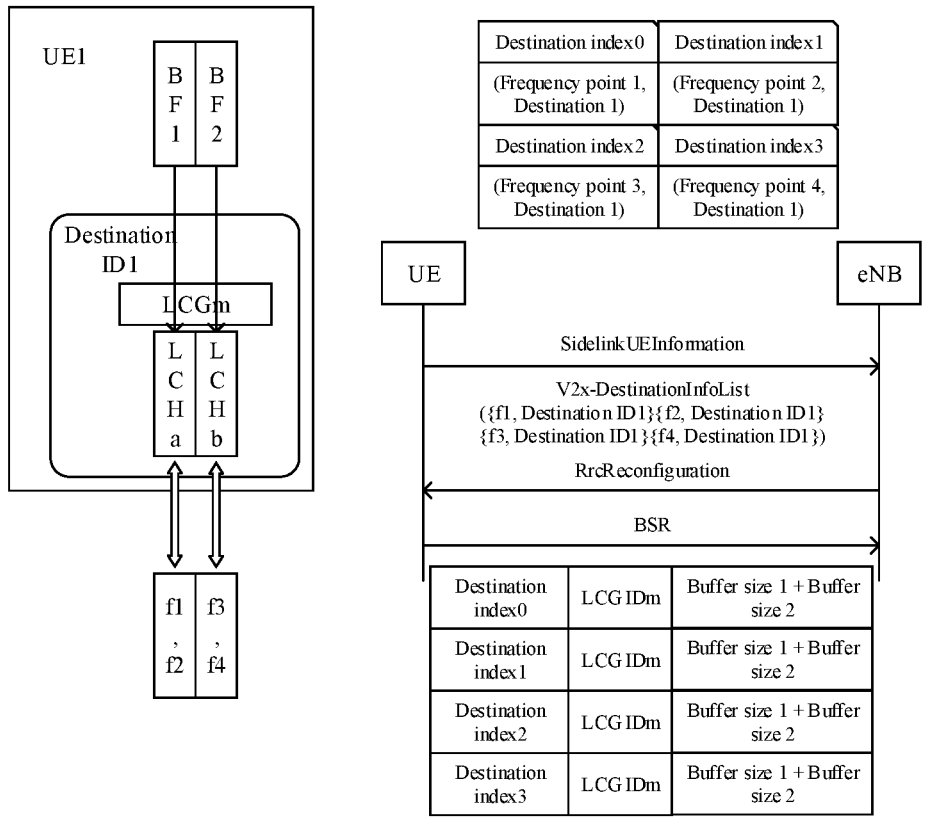
FIG. 6 is a schematic diagram illustrating that different logical channels use different frequency point set resources according to an embodiment of the present disclosure.

2) All logical channels in a logical channel group may use resources on multiple frequency points, which may be divided into the following cases.

i. Each logical channel in the logical channel group can only use a single frequency point resource, and different logical channels may use resources on different frequency points. FIG. 4 is a schematic diagram illustrating that each logical channel in a logical channel group uses only one and different frequency point resource according to an embodiment of the present disclosure. As shown in FIG. 4, in this case, the existing BSR mechanism is still feasible. Specifically, before each reporting, the UE first counts a sum of buffer sizes on all different logical channels using the same frequency point resource in the same logical channel group, and then reports the BSR corresponding to the destination index of different frequency points.

ii. All logical channels in the logical channel group may use resources on multiple frequency points.

a) Different logical channels use the same frequency point set resources. FIG. 5 is a schematic diagram illustrating that different logical channels use an same frequency point set according to an embodiment of the present disclosure. As shown in FIG. 5, in this case, the UE selects a set of available frequency points for data transmission for the data of the Vehicle-to-Everything (V2X) service type corresponding to the destination ID. If the existing SidelinkUEInformation and BSR reporting mechanism is followed, when the UE assembles a BSR request resource including a destination index, a logical channel group ID, and a buffer size, the UE does not know request resources on which frequency point in a set of available frequency points. A possible implementation method is that the UE reports the destination index, the logical channel group ID, and the Buffer Size on each available frequency point corresponding to a set of available frequency points, resulting in reporting the same buffer size multiple times corresponding to different frequency points. The base station misunderstands that the UE will send data of a data size multiple times of the buffer size on multiple frequency points.

b) Different logical channels use resources of different frequency point sets. FIG. 6 is a schematic diagram illustrating that different logical channels use different frequency point set resources according to an embodiment of the present disclosure. As shown in FIG. 6, in this scenario, if the UE uses the existing SidelinkUEInformation and BSR mechanism. In the same logical channel group, for a logical channel corresponding to multiple frequency point resources, and some of these frequency points are used by multiple logical channels in the logical channel group, the MAC layer of the transmitting end UE cannot accurately divide the Buffer Size of this logical channel in units of frequency points. Therefore, the destination index, the logical channel group ID and the Buffer Size can only be reported comprehensively, but multiple frequency points are used in this case, so the destination index needs to be changed to report the same logical channel group ID and Buffer Size multiple times. This results in reporting the same buffer size multiple times corresponding to different frequency points. The base station misunderstands that the UE will send data of a data size multiple times of the buffer size on multiple frequency points.

In view of the above scenario, the present disclosure provides the following manners.

It should be added that in this application document, the buffer size of the frequency point is the data size, and the buffer size of the logical channel is the buffer size. The buffer size may be divided into multiple data sizes, or a portion of buffer sizes of multiple logical channels may be selected to be combined as the data size.

For the destination ID, multiple frequency point resources may be used, but all logical channels in the logical channel group use the same frequency point resource set. In order to avoid repeatedly transmission of the same buffer size, causing the repeated resource requests, the following multiple methods may be adopted for improvement.

1) The base station may configure the number of frequency points of different service type of data splits for different UEs and split ratios of respective frequency points. The UE selects the corresponding number of frequency points according to the number of data splits, as shown in Table 1. Table 1 is a correspondence table between frequency points and split ratio according to the embodiment of the present disclosure.

| Frequency point | $f_a$ | $f_b$ | $f_c$ |
|---|---|---|---|
| Split Ratio | Split ratio$_a$ | Split ratio$_b$ | Split ratio$_c$ |

When reporting the BSR, the number of resources that should be applied on each frequency point is calculated according to the split ratio. Specifically, when reporting the BSR of a certain logical channel group, the UE first calculates a sum of buffer sizes of the same frequency point set that may be used by each logical channel in the logical channel group, and then configures the split ratio of each frequency point according to the base station, according to the following formula an exact number of resources of each frequency point requested is calculated according to the following formula:

Resource on $f_a$=((buffer size)*(split ratio$_a$)).

Finally, the destination index corresponding to different frequency points reports the BSR of the corresponding buffer size. In one or more embodiments, the UE may report a data rate corresponding to the logical channel or each V2X service and Prose Per-Packet Priority (PPPP) information to the base station, which is convenient for the base station to make a correct split decision.

2) The base station may configure split data sizes for different logical channels for the UE, and at the same time, configure the UE to use priority for different frequency points corresponding to the same service in the same logical channel; or configure a main frequency point and a series of auxiliary frequency points corresponding to the same service in the same logical channel for the UE, or configure a use order of the frequency points with the same priority for the same service in the same logical channel for the UE. At the time of making a resource request, the UE selects a first frequency point to transmit, when a data size1 of a logical channel (LCH1) is greater than a split data size1, the UE may at most request resources of the split data size1 at the first frequency point. For remaining data of this logical channel, the UE continues to consider applying for the BSR to request resources on a second frequency point, if ((data size1)−(split data size1))<(split data size1)), then the UE requests resources of ((data size1)−(split data size1)) on the second frequency point; otherwise, the UE sends at most resources of (split data size1) on the second frequency point, and continues to consider requesting resources for remaining data for this logical channel on a third frequency point, and so on. Finally, the UE calculates a sum of resources requested for each frequency point on all corresponding logical channels in the logical channel group, and reports in units of logical channel groups.

Figure 7:
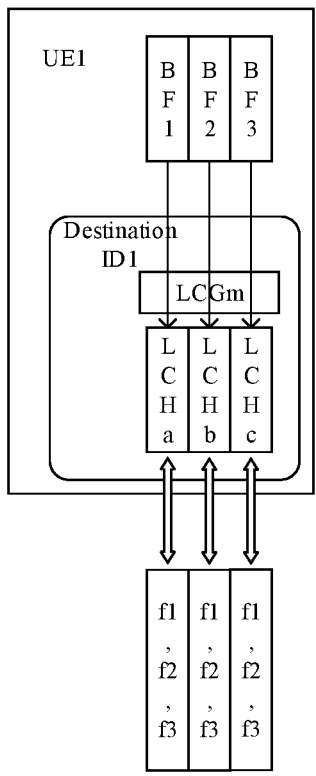
FIG. 7 is a schematic diagram of reporting a corresponding destination ID in a V2X-DestinationInfoList corresponding to a frequency point according to an embodiment of the present disclosure.
Figure 7:
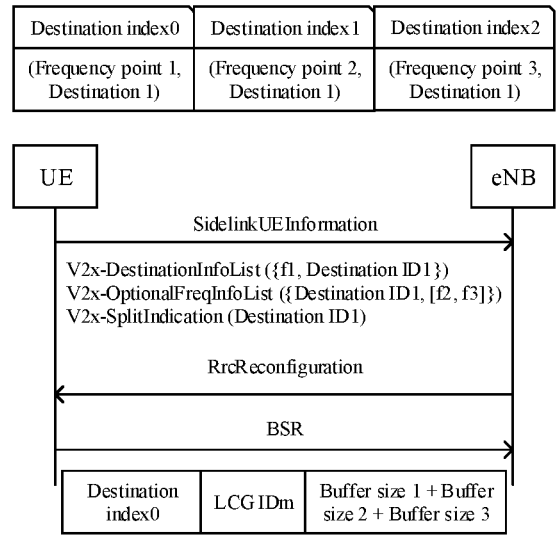

3) When reporting SidelinkUEInformation, the UE only reports the corresponding destination ID in the V2X-DestinationInfoList corresponding to one frequency point. FIG. 7 is a schematic diagram of reporting a corresponding destination ID on a V2X-DestinationInfoList corresponding to one frequency point according to an embodiment of the present disclosure. As shown in FIG. 7, the UE reports information on a set of other optional frequency points corresponding to this destination ID, and may include a related indication of a data split supported by the destination ID. The UE reports the corresponding destination index when reporting the BSR. After searching the corresponding destination ID according to the destination index, the base station allocates resources on optional frequency points according to the split indication and/or the set of optional frequency points corresponding to the destination ID. The sum of the resources allocated by the base station on frequency points should meet a requirement of a size of the resource corresponding to the destination index indicated by the UE when reporting the BSR.

For a case where only one frequency point resource may be used for any logical channel in the same logical channel group, the following methods may be adopted for BSR enhancement.

1) First, the BSR is reported in units of logical channels. In this case, reporting BSR by the UE may solve the need to select different frequency point resources for sidelink transmission in units of the logical channels. To enable the base station to allocate different logical channel resources according to the priority during scheduling, it may be considered that the base station configures a mapping relationship between the logical channel and the PPPP, or the UE simultaneously reports information about the logical channel group and logical channel in the BSR.

For a case where the frequency point resource used for any logical channel in the same logical channel group is different, the following methods may be adopted for BSR enhancement.

Figure 8:
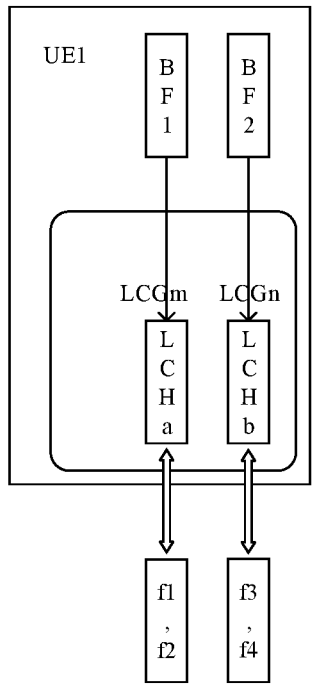
FIG. 8 is a schematic diagram of reporting a destination ID and a corresponding logical channel or logical channel set in a v2x-DestinationInfoList of different frequency points according to an embodiment of the present disclosure.
Figure 8:
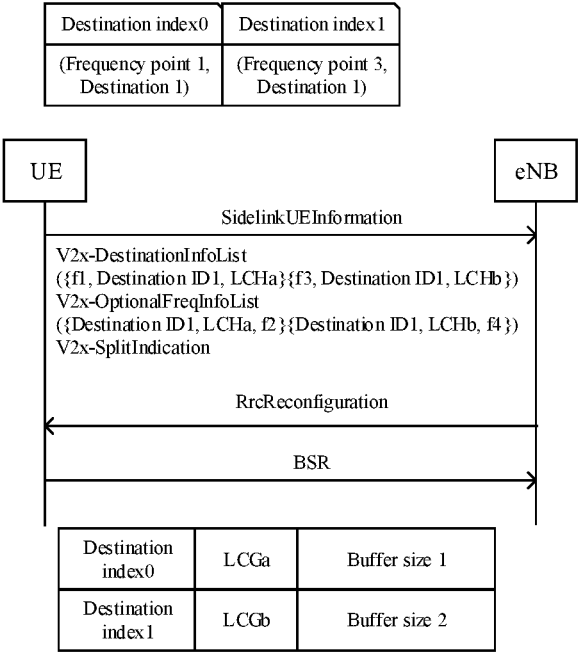

1) The UE reports the destination ID and the corresponding logical channel or the logical channel set in the v2x-DestinationInfoList of different frequency points in the SidelinkUEInformation. FIG. 8 is a schematic diagram of reporting the destination ID and a corresponding logical channel or a logical channel set in the v2x-DestinationInfoList of different frequency points according to an embodiment of the present disclosure. As shown in FIG. 8, the frequency point reported at this time may be regarded as the anchor carrier frequency point (anchor frequency point) for a specific logical channel of the destination ID. At the same time, the UE still needs to separately report the destination ID and information of the set of other optional frequency points that may be supported by each logical channel, as well as an indication of supporting the split. Subsequently, when reporting the BSR, the UE needs to report the buffer size corresponding to each logical channel. The base station may find the set of optional frequency points and the split indication through the destination ID and the specific logical channel, and then the base station may allocate resources on optional frequency points. In one or more embodiments, the UE may report a resource allocation ratio of each frequency point corresponding to the same destination ID and the same logical channel to the base station, so that the base station may allocate the resources on frequency points to the UE according to a specific ratio. (FIG. 7)

The present disclosure will be described below in detail in conjunction with specific embodiments.

Specific Embodiment One

This specific embodiment illustrates how a UE reports a BSR for a resource request in a scenario where a destination ID may only use resources on one frequency point, which is illustrated through examples 1 to 2 in detail.

It is assumed that a current service 1 corresponds to a destination ID1, a service 2 corresponds to a destination ID2, and a service 3 corresponds to a destination ID3. The destination ID1 may only use resources on a frequency point f1, the destination ID2 may only use the resources on the frequency point f1, and the destination ID3 may only use resources on the frequency point f2. Two examples are included.

Example One

In a highway scenario, Mary and John are driving vehicles UE1 and UE2 with a v2x communication function, the UE1 and the UE2 are within a Sidelink communication range.

In this case, the UE1 wants to perform broadcasting of a service type 1. First, the UE1 needs to report a v2x-DestinationInfoList {f1, Destination ID1, Destination ID2} related to an available frequency point f1 of a destination ID1 in SidelinkUEInformation. In this case, a base station may know Destination Index0={f1, Destination ID1}, Destination Index1={f1, Destination ID2} according to serialization rules of Destination Index, the base station will configure corresponding resources for the UE1 according to the reported information, and notify UE1 through a radio resource control (RRC) reconfiguration message. After that, the UE1 reports the BSR, in the format of {Destination Index0, LCG1, Buffer Size}, for requesting resources for a destination ID1.

Through a Destination Index0, the base station may determine that resources with a Buffer Size used for a service 1 should be allocated to the UE1 on the frequency point f1.

Example Two

In this case, a UE1 wants to perform broadcasting of a service type 1 and a service type 3. First, the UE1 needs to report a v2x-DestinationInfoList related to a frequency point f1 available for a destination ID1 and a v2x-DestinationInfoList related to a frequency point f3 available for a destination ID3 in SidelinkUEInformation, as shown in Table 2.

TABLE 2

|  | Destination ID1 related | Destination ID3 related |
|---|---|---|
| v2x-DestinationInfoList | {f1, [Destination ID1, Destination ID2]} | {f2, [Destination ID3]} |

In this case, contents shown in Table 3 can be known according to serialization rules of Destination Index, and Table 3 is an example 2 derived from Table 2.

TABLE 3

| Destination Index0 | Destination Index1 | Destination Index2 |
|---|---|---|
| {f1, Destination ID1} | {f1, Destination ID2} | {f2, Destination ID3} |

The base station configures corresponding resources for the UE according to the reported information, and informs the UE1 through a RRC reconfiguration message. Then the UE reports a BSR for requesting resources for the destination ID1 and the destination ID3 with the format of {Destination Index0, LCG1, Buffer Size1}, {Destination Index2, LCG2, Buffer Size2}. The base station may determine that resources with a Buffer Size 1 used for a service 1 should be allocated to the UE1 on the f1 frequency point through a Destination Index0, and the base station may determine that resources with a Buffer Size 2 used for a service 3 should be allocated to the UE1 on the f2 frequency point through a Destination Index1.

Specific Embodiment Two

This specific embodiment may use multiple frequency point resources for a destination ID in which all logical channels in a logical channel group may only use one frequency point resource, and different logical channels may use different frequency point resources. In this case, how the UE reports the BSR for the resource request is explained through examples 3 to 4.

It is assumed that a current service 1 corresponds to a destination ID1, a service 2 corresponds to a destination ID2, and a service 3 corresponds to a destination ID3, and the destination ID1 may use resources on frequency points f1 and f2, where a logical channel group 1 uses resources on f1, and a logical channel group 2 uses resources on f2; the destination ID2 may use resources on frequency points f2 and f3, where the logical channel group 1 uses the resources on f2, the logical channel group 2 uses the resources on f3, and the destination ID3 may use the resources on frequency points f3 and f4, where the logical channel group 1 uses the resources on f3 and the logical channel group 2 uses the resources on f4. The specific embodiment 3 includes the following two examples.

Example Three

In this case, a UE1 needs to perform broadcasting of a service type 1. First, the UE1 needs to report a v2x-DestinationInfoList related to available frequency points f1 and f2 in a destination ID1 in SidelinkUEInformation, reported contents are as shown in Table 4, and Table 4 is an example 4 derived from Table 1.

TABLE 4

|  | Destination ID1 related | Destination ID3 related |
|---|---|---|
| v2x-DestinationInfoList | {f1, [Destination ID1]} | {f2, [Destination ID1, Destination ID2]} |

In this case, contents shown in Table 5 can be known according to serialization rules of Destination Index, and Table 5 is Table 2 according to Example 3.

TABLE 5

| Destination Index0 | Destination Index1 | Destination Index2 |
|---|---|---|
| {f1, Destination ID1} | {f2, Destination ID1} | {f2, Destination ID1} |

At the same time, the base station will configure the corresponding frequency point resources for the UE according to the reported information of the UE, and then inform the UE1 through the RRC reconfiguration message. Subsequently, the UE may report a BSR for requesting resources for a destination ID1, it is assumed that resources of a Data Size are required. In this case, an AS layer inside the UE divides data of a data size into a data packets which are of Buffer Size1 and Buffer Size2 respectively and have different PPPP according to service requirements, where the data packet of Buffer Size1 is sent through an LCG1, the data packet of Buffer Size2 is sent through an LCG2, and before the UE1 determines by itself that for the destination ID1, the LCG1 is associated with f1 and the LCG2 is associated with f2. In this case, the UE reports the BSR for these two data packets of different PPPP separately, as shown in Table 6, and Table 6 is an example 3 derived from Table 3.

TABLE 6

| BSR | | |
|---|---|---|
| Destination Index0 | LCG1 | Buffer Size1 |
| Destination Index1 | LCG1 | Buffer Size2 |

After receiving the reported information, the base station knows that for the destination ID1 of the UE1, it should allocate resources of the Buffer Size1 on f1 and allocate resources of the Buffer Size2 on f2.

Example Four

In this case, a UE1 needs to perform broadcasting of a service type 1 and a service type 2. First, the UE1 needs to report a v2x-DestinationInfoList related to available frequency points f1, f2 and f3 in a destination ID1 and a destination ID2 in SidelinkUEInformation, as shown in Table 7, and Table 7 is an example 4 derived from Table 4.

TABLE 7

| v2x-DestinationInfoList | {f1, [Destination ID1]} | {f2, [Destination ID1, Destination ID2]} | {f3, Destination ID2, Destination ID3} |
|---|---|---|---|

In this case, contents shown in Table 8 can be known according to serialization rules of Destination Index, and Table 8 is an example 4 derived from Table 5.

TABLE 8

| Destination Index0 | Destination Index1 | Destination Index2 | Destination Index3 | Destination Index4 |
|---|---|---|---|---|
| {f1, Destination ID1} | {f2, Destination ID1} | {f2, Destination ID2} | {f3, Destination ID2} | {f3, Destination ID3} |

At the same time, the base station will configure the corresponding frequency point resources for the UE according to the reported information of the UE, and then inform the UE1 through the RRC reconfiguration message. Subsequently, the UE1 may report a BSR for requesting resources for destination ID1 and destination ID2. It is assumed that the destination ID1 needs resources of a Data SizeA in total, and the destination ID2 needs resources of a Data SizeB in total, in this case, the AS layer inside the UE divides, according to service requirements, data of the Data SizeA into data packets which are of Buffer Size1 and Buffer Size2 respectively and have different PPPP, divides data of the Data SizeB into data packets which are of Buffer Size3 and Buffer Size4 respectively and have different PPPP. Furthermore, the UE1 determines by itself that for the destination ID1, the LCG1 is associated with f1 and the LCG2 is associated with f2; and for the destination ID2, the LCG1 is associated with f2 and the LCG2 is associated with f3. In this case, the UE reports the BSR for the current business requirements, as shown in Table 9, and Table 9 is an example 4 derived from Table 6.

TABLE 9

| BSR | | |
|---|---|---|
| Destination Index0 | LCG1 | Buffer Size1 |
| Destination Index1 | LCG2 | Buffer Size2 |

TABLE 9-continued

| BSR | | |
|---|---|---|
| Destination Index2 | LCG2 | Buffer Size3 |
| Destination Index3 | LCG2 | Buffer Size4 |

After receiving the reported information, the base station knows that for the destination ID1 of the UE1, it should allocate resources of the Buffer Size1 on f1, allocate resources of the Buffer Size2 on f2, and allocate resources of the Buffer Size3 on f2 for the destination ID2, and allocate resources of the Buffer Size4 on f3.

Specific Embodiment Three

This specific embodiment may use multiple frequency point resources for a destination ID in which all logical channels in a logical channel group may only use one frequency point resource, and different logical channels may use different frequency point resources. In view of this case, the manner in which the UE reports the BSR will be explained through example 5.

It is assumed that a current service 1 corresponds to a destination ID1, and the destination ID1 has resources of available frequency points f1, f2, and f3, and at the same time, the frequency point f1 corresponds to a logical channel 1 and a logical channel 3, f2 corresponds to a logical channel 2 and a logical channel 4, and f3 corresponds to a logical channel 5, and logical channels 1, 2 and 3 are in a logical channel group 1; logical channels 4, 5 are in logical channel group 2. The specific embodiment 3 includes the following example.

Embodiment Five

In this case, a UE1 needs to perform broadcasting of a service type 1. First, the UE1 needs to report a v2x-DestinationInfoList corresponding to available frequency points f1, f2, f3 in a destination ID1 in SidelinkUEInformation, as shown in Table 10, and Table 10 is an example 5 derived from Table 1.

TABLE 10

| v2x-DestinationInfoList | {f1, Destination ID1} | {f2, Destination ID1} | {f3, Destination ID1} |
|---|---|---|---|

In this case, contents shown in Table 11 can be known according to serialization rules of Destination Index, and Table 11 is an example 5 derived from Table 2.

TABLE 11

| Destination Index0 | Destination Index1 | Destination Index2 |
|---|---|---|
| {f1, Destination ID1} | {f2, Destination ID1} | {f3, Destination ID1} |

At the same time, the base station configures corresponding frequency point resources for the UE according to the reported information of the UE, and then informs the UE1 through a RRC reconfiguration message. In this case, if the UE needs to transmit data packets through logical channels 1, 2, 3, 4, and 5 respectively, which are Buffer Size1, Buffer Size2, Buffer Size3, Buffer Size4, Buffer Size5. In this case, the UE1 should report the BSR in the following manner, as shown in Table 12, and Table 12 is an example 5 derived from Table 3.

TABLE 12

| | | |
|---|---|---|
| Destination Index0 | LCG1 | Buffer Size1 + Buffer Size3 |
| Destination Index1 | LCG1 | Buffer Size2 |
| Destination Index1 | LCG2 | Buffer Size4 |
| Destination Index2 | LCG2 | Buffer Size5 |

After receiving the reported information, the base station knows that for the destination ID1 of the UE1, it should allocate resources (buffer size1+buffer size3) on f1, allocate resources of buffer size2 (for the logical channel group 1) and buffer size4 on f2 (for a logical channel group 2), and allocate resources of buffer size5 on f3.

Specific Embodiment Four

This specific embodiment may use multiple frequency point resources for a destination ID, where any logical channel included in a logical channel group may use multiple frequency point resources, but each logical channel uses a same frequency point resource set, and different logical channel groups may use the same or different frequency point resource sets. In view of this case, the manner in which the UE reports the BSR will be explained through examples 6 to 8.

It is assumed that for a service type 1, corresponding to a destination ID1, a set of available frequency point resources is {f1, f2, f3, f4}. At the same time, logical channels 1, 2 correspond to a frequency point set {f1, f2}, which belongs to a logical channel group 1; logical channels 3, 4 correspond to the frequency point set {f1, f2}, which belongs to a logical channel group 2; logical channels 5, 6 correspond to a frequency point set {f3, f4}, which belongs to a logical channel group 3. The specific embodiment four includes the following three examples.

Example Six

In this case, a UE1 needs to perform broadcasting of a service type 1. First, the UE1 needs to report a v2x-DestinationInfoList corresponding to available frequency points f1, f2, f3, f4 in a destination ID1 in SidelinkUEInformation, as shown in Table 13, and Table 13 is Table 1 according to Example 6.

TABLE 13

| v2x-DestinationInfoList | {f1, Destination ID1} | {f2, Destination ID1} | {f3, Destination ID1} | {f4, Destination ID1} |
|---|---|---|---|---|

In this case, contents shown in Table 14 can be known according to serialization rules of Destination Index, and Table 14 is an example 6 derived from Table 2.

TABLE 14

| Destination Index0 | Destination Index1 | Destination Index2 | Destination Index3 |
|---|---|---|---|
| {f1, Destination ID1} | {f2, Destination ID1} | {f3, Destination ID1} | {f4, Destination ID1} |

In addition, the UE needs to report a resource split ratio {f1:f2:f3:f4}={2:1:2:1} of respective frequency points. The base station configures corresponding frequency point resources for the UE1 according to the reported information of the UE1, and then informs the UE1 through a RRC reconfiguration message. If data sizes that the UE needs to transmit through logical channels 1, 2, 3, 4, 5, and 6 in this case are Buffer Size1, Buffer Size2, Buffer Size3, Buffer Size4, Buffer Size5, Buffer Size6, then the BSR reported by the UE in this case is contents shown in Table 15, and Table 15 is an example 6 derived from Table 3.

TABLE 15

| | | |
|---|---|---|
| Destination Index0 | LCG1 | (2/3)*(Buffer Size1 + Buffer Size2) |
| Destination Index1 | LCG1 | (1/3)*(Buffer Size1 + Buffer Size2) |
| Destination Index0 | LCG2 | (2/3)*(Buffer Size3 + Buffer Size4) |
| Destination Index1 | LCG2 | (1/3)*(Buffer Size3 + Buffer Size4) |
| Destination Index2 | LCG3 | (2/3)*(Buffer Size5 + Buffer Size6) |
| Destination Index2 | LCG3 | (1/3)*(Buffer Size5 + Buffer Size6) |

After receiving the BSR reported from the UE, the base station may accurately allocate resources on frequency points for the UE1.

Example Seven

In this case, a UE1 needs to perform broadcasting of a service type 1. First, the UE1 needs to report a v2x-DestinationInfoList corresponding to available frequency points f1, f2, f3, f4 in a destination ID1 in SidelinkUEInformation, as shown in Table 16, and Table 16 is Table 1 according to Example 7.

TABLE 16

| v2x-DestinationInfoList | {f1, Destination ID1} | {f2, Destination ID1} | {f3, Destination ID1} | {f4, Destination ID1} |
|---|---|---|---|---|

In this case, contents shown in Table 17 can be known according to serialization rules of Destination Index, and Table 17 is an example 7 derived from Table 2.

TABLE 17

| Destination Index0 | Destination Index1 | Destination Index2 | Destination Index3 |
|---|---|---|---|
| {f1, Destination ID1} | {f2, Destination ID1} | {f3, destination ID1} | {f4, Destination ID1} |

In addition, a UE needs to report priorities of frequency points within each logical channel (f1>f2, f3>f4, which applies to each logical channel) and corresponding to a split data size of each frequency point, {LCH1, LCH2, LCH3, LCH4, LCH5, LCH6}={SplitDataSize1, SplitDataSize2, SplitDataSize3, SplitDataSize4, SplitDataSize4, SplitDataSize5, SplitDataSize6} (the split data size of each frequency point may also be set to a same value), the base station configures corresponding frequency point resources for the UE1 according to the reported information of the UE1, and then informs UE1 through a RRC reconfiguration message. If data sizes of the UE1 needs to transmit through logical channels 1, 2, 3, 4, 5, 6 in this case are Buffer Size1, Buffer Size2, Buffer Size3, Buffer Size4, Buffer Size5, Buffer Size6 (assuming that all Buffer Size5 are greater than SplitDataSizes). Then the BSR reported by the UE1 in this case are contents shown in Table 18, and Table 18 is an example 7 derived from Table 3.

TABLE 18

| Destination Index0 | LCG1 | SplitDataSize1 + SplitDataSize2 |
| Destination Index1 | LCG2 | SplitDataSize3 + SplitDataSize4 |
| Destination Index0 | LCG2 | SplitDataSize3 + SplitDataSize4 |
| Destination Index1 | LCG2 | Buffer Size3 − SplitDataSize3 + Buffer Size4 − SplitDataSize4 |
| Destination Index2 | LCG3 | SplitDataSize5 + SplitDataSize6 |
| Destination Index3 | LCG3 | Buffer Size5 − SplitDataSize5 + Buffer Size6 − SplitDataSize6 |

After receiving the BSR reported from the UE, the base station may accurately allocate resources on frequency points for the UE1.

Example Eight

In this case, a UE1 needs to perform broadcasting of a service type 1. It is assumed that for the service type 1, a corresponding anchor frequency point is f1, and a set of remaining available frequency points is {f2, f3, f4}, then when firstly reporting SidelinkUEInformation, the UE only needs to include indication information of a Destination ID1 in a v2x-DestinationInfoList corresponding to f1, which is {f1, Destination ID1}, and also needs to report information on the set of other optional frequency points {DestinationID1, [f2, f3, f4]} corresponding to Destination ID1, after receiving the reported information, the base station will configure the resources on {f1, f2, f3, f4} for the UE1 accordingly. Then when the UE reports the BSR, it only needs to report a BSR {0, LCG1, Buffer Size} about the anchor frequency point f1, the base station will allocate resources of a same buffer Size on each optional frequency point (including the anchor frequency point) {f1, f2, f3, 4} according to the report.

Specific Embodiment Five

This specific embodiment is directed to a case where any logical channel may only use a frequency point resource, and a manner in which a UE reports a BSR is explained through an example 9.

It is assumed that for a service type one, corresponding to a destination ID1, for a destination ID1, an available frequency point set is {f1, f2, f3}.

A logical channel 1 corresponds to a frequency point f1 and a logical channel 2 corresponds to a frequency point f2, a logical channel 3 corresponds to a frequency point f3. The specific embodiment five includes the following example.

Example Nine

In this case, a UE1 needs to perform broadcasting of a service type 1. First, a UE reports corresponding v2x-DestinationInfoList {f1,Destination ID1} {f2,Destination ID2} {f3,Destination ID3} in SidelinkUEinformation, in this case, Destination Index0={f1,Destination ID1},Destination Index1={f2,Destination ID1},Destination Index2={f3,Destination ID1} may be obtained according to serialization rules of Destination Index, after receiving report information, a base station allocates corresponding resources for the UE1. Subsequently, when reporting a BSR, the UE1 directly reports in units of logical channels. Then in this case, a reporting format should be BSR1={0, LCH1, Buffer Size1}, BSR2={1, LCH2, Buffer Size2}, BSR3={2, LCH3, Buffer Size3}, after receiving the BSR reported by the UE1, the base station may allocate resources on the corresponding frequency point for the UE1.

Specific Embodiment Six

This specific embodiment is directed to a case where any logical channel may use a set of frequency points, and a manner in which a UE reports a BSR is explained through an example 10.

It is assumed that for a service type one, corresponding to a destination ID1, for a destination ID1, an available frequency point set is {f1, f2, f3}, where a logical channel 1 corresponds to {f1, f2} and a logical channel 2 corresponds to {f2, f3}, a logical channel 3 corresponds to {f1, f2, f3}, for the destination ID1 and the logical channel 1, a corresponding anchor frequency point is f1; for the destination ID1 and the logical channel 2, the corresponding anchor frequency point is f2; for the destination ID1 and the logical channel 3, the corresponding anchor frequency point is f1. The specific embodiment 6 includes the following example.

Example Ten

In this case, a UE1 needs to perform broadcasting of a service type 1. First, the UE1 reports a Destination ID1 and an LCH1 in a v2x-DestinationInfoList corresponding to f1 in SidelinkUEinformation with a format of {f1, Destination ID1, LCH1}, and reports the Destination ID1 and an LCH2 in the v2x-DestinationInfoList corresponding to f2 with a format of {f2, Destination ID1, LCH2}, and reports the Destination ID1 and an LCH3 in the v2x-DestinationInfoList corresponding to f3 with a format of {f3, Destination ID1, LCH3}.In addition, the UE1 still needs to report a set of destination IDs and other optional frequency point set information corresponding to a logical channel and a split indication. Specifically, in this case, the UE1 still needs to report {Destination ID1, LCH1, [f2]}, {DestinationID1, LCH2, [B]}, {DestinationID1, LCH3, [f2, f3]}, and Destination Index0={f1,Destination ID1}, Destination Index1={f2,Destination ID1}, Destination Index2={f3,Destination ID1} may be obtained according to serialization rules of Destination Index, after receiving report information from the UE1, a base station allocates resources on the corresponding frequency point for the UE1. Subsequently, the UE1 may report a BSR and a BSR0 only through the anchor frequency point as follows: BSR0={0, LCH1, Buffer Size1} BSR1={1, LCH2, Buffer Size2} BSR2={2, LCH3, Buffer Size3}, after receiving the BSR, the base station may allocate resources on all optional frequency points for the UE1, specifically, for the LCH1, the base station allocates a total of resources of the Buffer Size1 on {f1, f2}; for the LCH2, the base station allocates a total of resources of the Buffer Size2 on {f2, f3}; for the LCH3, the base station allocates a total of resources of the Buffer Size3 on {f1, f2, f3}.

From the description of the embodiments described above, it will be apparent to those skilled in the art that the methods in the embodiments described above may be implemented by software plus a necessary general-purpose hardware platform, or may of course be implemented by hardware. However, in many cases, the former is an implementation manner. Based on this understanding, the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment Two

The embodiment of the present disclosure further provides a resource request device for implementing the above-mentioned embodiments and other embodiments. What has been described will not be repeated. As used below, the term "module" may be software, hardware or a combination thereof capable of implementing predetermined functions. The device in the embodiment described below is implemented by software, but implementation by hardware or by a combination of software and hardware is also possible and conceivable.

According to an embodiment of the present disclosure, a resource request device is further provided. The device includes:

a first acquisition module, which is configured to acquire a buffer size corresponding to an same frequency point or anchor frequency point in a logical channel group;

a first transmission module, which is configured to transmit an Sidelink BSR to a second communication node, wherein the Sidelink BSR comprises at least one of: a destination index corresponding to the same frequency point or anchor frequency point; a logical channel group identifier or a logical channel identifier; and the buffer size.

According to another embodiment of the present disclosure, a resource request device is further provided. The device includes:

a second acquisition module, which is configured to acquire a buffer size corresponding to one or more frequency points in a logical channel, wherein the logical channel uses the one or more frequency points;

a second transmission module, which is configured to report an Sidelink BSR according to a destination index corresponding to the one or more frequency points respectively, wherein the Sidelink BSR comprises in the logical channel, use the buffer size of the frequency point.

According to another embodiment of the present disclosure, a device for processing a resource request is further provided. The device includes:

a first reception module, which is configured to receive an Sidelink BSR reported by a first communication node, wherein the Sidelink BSR comprises at least one of: one or more logical channels in a logical channel group, a destination index corresponding to an same frequency point to be used or an anchor frequency point to be used; a logical channel group identifier or a logical channel identifier; a buffer size of the same frequency point or anchor frequency point; and an allocation module, which is configured to allocate resources on frequency points for the first communication node according to the Sidelink BSR.

It is to be noted that each of the modules described above may be implemented by software or hardware. Implementation by hardware may, but may not necessarily, be performed in the following manners: the various modules described above are all located in a same processor, or the various modules described above are located in their respective processors in any combination form.

Embodiment Three

According to another embodiment of the present disclosure, a processor is further provided. The processor is used for executing programs which, when executed, execute the method of any one of the embodiments described above.

Embodiment Four

According to another embodiment of the present disclosure, a storage medium is further provided. The storage medium includes stored programs which, when executed, execute the method of any one of the embodiments described above.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and the modules or steps may be implemented by program codes executable by the computing device, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are merely some embodiments of the present disclosure and are not intended to limit the present disclosure. Those skilled in the art can make various modifications and changes. Any modifications, equivalent substitutions, improvements and the like within the spirit and principle of the present disclosure shall fall within the scope of protection of the present disclosure.

It should be understood by those skilled in the art that the embodiments of the present disclosure may be provided as methods, systems or computer program products. Therefore, the present disclosure may be embodied in the form of a hardware embodiment, a software embodiment, or a combination of hardware and software embodiments. In addition, the present disclosure may be embodied in the form of a computer program product implemented on one or more computer-usable storage media (including, but not limited to, a disk memory, an optical memory and the like) which include computer-usable program codes.

The present disclosure is described with reference to flowcharts and/or block diagrams of the methods, devices (systems) and computer program products according to the embodiments of the present disclosure. It should be understood that computer program instructions may implement each flow and/or block in the flowcharts and/or the block diagrams and a combination of flows and/or blocks in the flowcharts and/or the block diagrams. These computer program instructions may be provided for a general-purpose computer, a special-purpose computer, an embedded processor or a processor of another programmable data processing device to produce a machine so that instructions executed by the computer or the processor of another programmable data processing device produce an device for implementing functions designated in one or more flows in the flowcharts and/or one or more blocks in the block diagrams.

These computer program instructions may be stored in a computer-readable memory that can cause the computer or another programmable data processing device to operate in a particular manner so that the instructions stored in the computer-readable memory produce a manufactured product including an instructing device. The instructing device implements the functions designated in the one or more flows in the flowcharts and/or the one or more blocks in the block diagrams.

These computer program instructions may be loaded onto the computer or another programmable data processing device so that a series of operation steps are performed on the computer or another programmable device to produce processing implemented by the computer. Therefore, instructions executed on the computer or another programmable device provide steps for implementing the functions designated in the one or more flows in the flowcharts and/or the one or more blocks in the block diagrams.

The above are only specific embodiments of the present disclosure and are not intended to limit the scope of the present disclosure.

What is claimed is:

1. A resource requesting method, comprising:
   acquiring, by a first communication node, buffer sizes of a plurality of logical channels corresponding to an anchor frequency point in a logical channel group;
   reporting, by the first communication node, a Sidelink Buffer Status Report (BSR) to a second communication node to cause the second communication node to allocate resources on a plurality of frequency points for the first communication node according to the Sidelink BSR, wherein the Sidelink BSR comprises:
   a destination index corresponding to the anchor frequency point;
   a logical channel group identifier or a logical channel identifier; and
   the buffer sizes,
   wherein before the first communication node reporting the Sidelink BSR to the second communication node, the method further comprises:
      sending, by the first communication node, the following information to the second communication node by using SidelinkUEInformation:
      a destination identifier; available frequency point information corresponding to the logical channel group and/or the logical channel, wherein the available frequency point information comprises the anchor frequency point supporting the destination identifier, and/or optional frequency point information; and
      data split indication information corresponding to the logical channel group and/or the logical channel;
      wherein destination identifier information is used for identifying the destination identifier; and
   wherein the second communication node allocates resources on the frequency points for the first communication node according to the Sidelink BSR comprises:
      receiving, by the second communication node, a BSR reported by the first communication node according to the destination index corresponding to the anchor frequency point;
      executing, by the second communication node, the following steps: acquiring the destination identifier according to the destination index in the BSR, and acquiring available frequency point information corresponding to the destination identifier; determining, by the second communication node, whether to use a frequency point in the available frequency point information according to the data split indication information; and
      in a case of determining to use the frequency point in the available frequency point information, determining, by the second communication node, a frequency point of resources to be allocated, allocating the resources to the frequency point of the resources to be allocated.

2. The method of claim 1, wherein before receiving the frequency point information configured or pre-configured by the second communication node, the method further comprises:
   reporting, by the first communication node, at least one of following parameters corresponding to each destination identifier or logic channel to the second communication node:
   a data rate;
   a reliability level; or
   ProSe Per-Packet Priority (PPPP) information.

3. The method of claim 1, wherein the method further comprises:
   calculating a sum of the buffer sizes of the plurality of logical channels corresponding to the anchor frequency point in the logical channel group.

4. The method of claim 1, wherein the first communication node reporting the Sidelink BSR to the second communication node comprises:
   reporting, by the first communication node, the BSR according to the destination index corresponding to the anchor frequency point.

5. A resource requesting device, comprising:
   a processor; and
   a memory for storing instructions executable by the processor,
   wherein when executing the instructions, the processor is configured to implement the resource requesting method of claim 1.

6. A nonvolatile computer readable storage medium, comprising stored programs which, when executed, execute the resource requesting method of claim 1.

7. The method of claim 1, wherein before the first communication node reporting the Sidelink BSR, the method further comprises:
   receiving, by the first communication node, frequency point information configured or agreed in advance by the second communication node, wherein the frequency point information comprises at least one of:
   Sidelink available frequency point information;
   a number of frequency points supporting data distribution or data duplication;
   a split ratio of each data split frequency point;
   one or more split data sizes corresponding to the logical channel, wherein the split data size is a maximum data transmission amount of data of the logical channel split to a frequency point;
   mapping information of a Sidelink logical channel and/or a Sidelink logical channel group and/or a destination identifier with one or more frequency points;
   a frequency point priority; or
   anchor frequency point information corresponding to the logical channel and/or the destination identifier.

8. The method of claim 7, wherein before the first communication node reporting the Sidelink BSR to the second communication node, the method further comprises at least one of:
   determining, by the first communication node, a number of frequency points to be used and/or a data transmission amount at each of the frequency points to be used according to at least one of: available frequency point information; the split data size; the split ratio; the number of frequency points supporting the data distribution or the data duplication; or the frequency point priority; or determining, by the first communication node, at least one of the following information corresponding to a bearer of the data duplication: a number of frequency points to be used, a mapping relationship between a frequency point and a logical channel corresponding to the bearer.

9. The method of claim 8, wherein the first communication node determining the number of frequency points to be used and/or a data transmission amount on the each of the frequency points according to at least one of: available frequency point information; the split data size; the split ratio; the number of frequency points supporting the data distribution or the data duplication; or the frequency point priority comprises at least one of:

in a case where the buffer size of the logical channel is less than the split data size, selecting, by the first communication node, a first frequency point to transmit data;

in a case where the buffer size of the logical channel is greater than the split data size, using, by the first communication node, the first frequency point to transmit data of the split data size, selecting other frequency points from available frequency points to transmit data of remaining data size, wherein data amount transmitted at each frequency point in the other frequency points does not exceed the split data size; and determining, by the first communication node, data amount transmitted at each frequency point according to the buffer size and the split ratio of the logical channel, wherein the first communication node selecting the first frequency point and/or the other frequency points in a manner of:

selecting, by the first communication node, the frequency points used for data distribution in a high-to-low order according to priorities of the frequency points.

10. A resource requesting method, comprising:

acquiring, by a first communication node, a buffer size of a logical channel corresponding to one or more frequency points, wherein the logical channel uses the one or more frequency points; and reporting a Sidelink Buffer Status Report (BSR) according to a destination index corresponding to the one or more frequency points respectively, wherein the BSR comprises the buffer size of the logical channel corresponding to the one or more frequency points used in the logical channel, wherein reporting the Sidelink BSR according to the destination index corresponding to the one or more frequency points respectively comprises:

in response to determining that the first communication node reports a v2x-Destination Info List corresponding to each frequency point in SidelinkUEInformation, reporting a correspondence between a destination ID and each logical channel simultaneously, and wherein in a case where the destination ID has an anchor frequency point corresponding to different logical channels, the first communication node reporting the v2x-Destination Info List corresponding to each frequency point in the SidelinkUEInformation comprises:

reporting, by the first communication node, in the SidelinkUEInformation, only the destination ID in the v2x-Destination Info List corresponding to the anchor frequency point in each logical channel.

11. A resource requesting device, comprising:
a processor; and
a memory for storing instructions executable by the processor,
wherein when executing the instructions, the processor is configured to implement the resource requesting method of claim 10.

12. A nonvolatile computer readable storage medium, comprising stored programs which, when executed, execute the resource requesting method of claim 10.

13. A resource request processing method, comprising:

receiving, by a second communication node, a Sidelink Buffer Status Report (BSR) reported by a first communication node, wherein the Sidelink BSR comprises: one or more logical channels in a logical channel group, a destination index corresponding to an anchor frequency point to be used; a logical channel group identifier or a logical channel identifier; and buffer sizes of a plurality of logical channels corresponding to an anchor frequency point; and allocating resources on a plurality of frequency points for the first communication node according to the Sidelink BSR, wherein before the second communication node receiving the Sidelink BSR reported by the first communication node, the second communication node receives the following information sent by the first communication node by using SidelinkUEInformation:

a destination identifier; available frequency point information corresponding to the logical channel group and/or the logical channel, wherein the available frequency point information comprises the anchor frequency point supporting the destination identifier, and/or optional frequency point information; and data split indication information corresponding to the logical channel group and/or the logical channel;

wherein destination identifier information is used for identifying the destination identifier; and wherein allocating resources on the frequency points for the first communication node according to the Sidelink BSR comprises:

receiving, by the second communication node, a BSR reported by the first communication node according to the destination index corresponding to the anchor frequency point;

executing, by the second communication node, the following steps: acquiring the destination identifier according to the destination index in the BSR, and acquiring available frequency point information corresponding to the destination identifier; determining, by the second communication node, whether to use a frequency point in the available frequency point information according to the data split indication information; and in a case of determining to use the frequency point in the available frequency point information, determining, by the second communication node, a frequency point of resources to be allocated, allocating the resources to the frequency point of the resources to be allocated.

14. The method of claim 13, wherein before the second communication node configuring or agreeing in advance to the frequency point information for the first communication node, receiving, by the second communication node, at least one of following parameters corresponding to each Vehicle-to-Everything (V2X) destination identifier or logical channel reported by the first communication node:

a data rate;
a reliability level; or
ProSe Per-Packet Priority (PPPP) information.

15. A resource request processing device, comprising:
a processor; and
a memory for storing instructions executable by the processor,
wherein when executing the instructions, the processor is configured to implement the resource request processing method of claim 13.

16. A nonvolatile computer readable storage medium, comprising stored programs which, when executed, execute the resource request processing method of claim 13.

17. The method of claim 13, wherein before the second communication node receiving the Sidelink BSR reported by the first communication node, frequency point information configured or agreed in advance by the second communication node for the first communication node comprises at least one of:
Sidelink available frequency point information;
a number of frequency points supporting data distribution or data duplication;
a split ratio of each data split frequency point;
one or more split data sizes corresponding to the logical channel, wherein the split data size is a maximum data transmission amount of data of the logical channel split to a frequency point;
mapping information of a Sidelink logical channel and/or a Sidelink logical channel group and/or a destination identifier with one or more frequency points;
a frequency point priority; or
information corresponding to the anchor frequency point of the logical channel and/or the destination identifier,
wherein before the second communication node configuring or agreeing in advance to the frequency point information for the first communication node, receiving, by the second communication node, at least one of following parameters corresponding to each Vehicle-to-Everything (V2X) destination identifier or logical channel reported by the first communication node:
a data rate;
a reliability level; or
ProSe Per-Packet Priority (PPPP) information.

* * * * *